C. B. SINER.
RIM FOR TIRES OF MOTOR VEHICLE WHEELS.
APPLICATION FILED FEB. 3, 1910.

977,843.

Patented Dec. 6, 1910.

2 SHEETS—SHEET 1.

WITNESSES:
Daniel Webster, Jr.
Thomas M. Smith.

INVENTOR
Charles B. Siner,
BY J. Walter Douglas
ATTORNEY.

C. B. SINER.
RIM FOR TIRES OF MOTOR VEHICLE WHEELS.
APPLICATION FILED FEB. 3, 1910.

977,843.

Patented Dec. 6, 1910.

2 SHEETS—SHEET 2.

WITNESSES:
Daniel Webster, Jr.
Thomas M. Smith

INVENTOR
Charles B. Siner,
BY J. Walter Douglas
ATTORNEY.

UNITED STATES PATENT OFFICE.

CHARLES B. SINER, OF PHILADELPHIA, PENNSYLVANIA.

RIM FOR TIRES OF MOTOR-VEHICLE WHEELS.

977,843. Specification of Letters Patent. Patented Dec. 6, 1910.

Application filed February 3, 1910. Serial No. 541,672.

*To all whom it may concern:*

Be it known that I, CHARLES B. SINER, a citizen of the United States, residing at the city of Philadelphia, in the county of Philadelphia and State of Pennsylvania, have invented certain new and useful Improvements in Rims for the Tires of Motor-Vehicle Wheels, of which the following is a specification.

My present invention has relation to a demountable rim for the tire of a motor vehicle-wheel; and in such connection it relates to means to wedgingly tighten by drawing the rim of an inflated tire and the rim of a wheel-felly respectively toward each other to hold together against displacement, and at the same time so arranged as to provide a handy and quick means to remove the tire-rim from the felly-rim of the wheel.

My invention embraces in constructive arrangement first, a tire-rim arranged to be slid onto the felly-rim of a motor vehicle wheel; and second, a tire-rim with unthreaded transverse tapering recesses at suitable distances apart and a felly-rim with threaded surface complementally tapering recesses for respectively inserting threaded complementally tapering bolts therethrough to wedgingly tighten by drawing the tire and felly rims toward each other, thereby to firmly hold the same together against displacement, in the event of loss of extremital means, such as a bolt-head or a cotter or other pin.

The nature, scope and characteristic features of my present invention will be more fully understood from the following description taken in connection with the accompanying drawings forming part hereof, in which—

Figure 1:
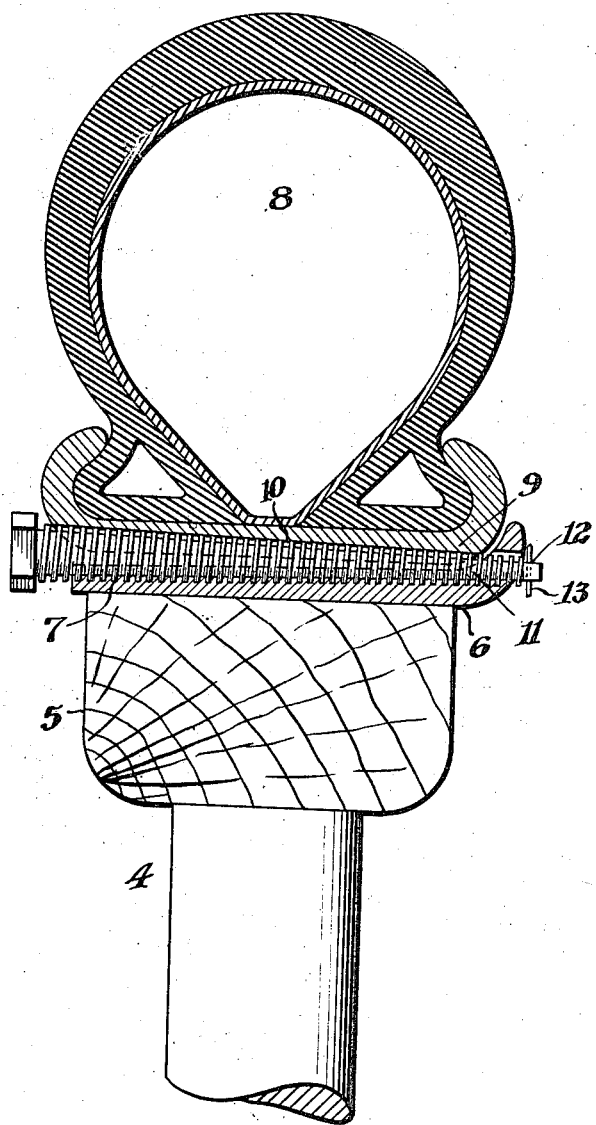
Figure 2:
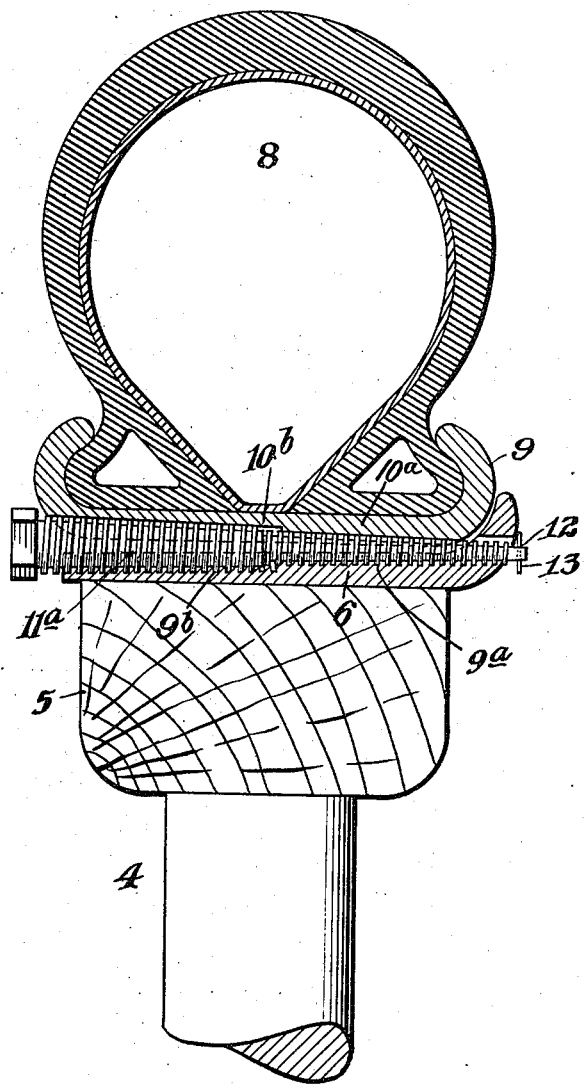

Figures 1 and 2, are vertical sectional views through two different forms of a demountable tire rim for a motor vehicle-wheel, embodying main features of my said invention.

Referring to the drawings 4 is an ordinary construction of wheel provided with a felly 5, and secured thereto in any well known manner is a flanged rim 6, having at suitable distances apart threaded tapering recesses 7.

8, is an inflated tire having a flanged inner clencher clamping rim 9, at suitable distances apart therein, provided with unthreaded complemental tapering recesses 10.

11 is a headed bolt having square-shape, in cross-section, threads arranged along the same and the bolt made tapering to the opposite reduced threaded end and provided thereat with an opening 12, for a cotter or other pin 13, to be inserted therethrough from that end. Each bolt 11, is adapted to be entered through the unthreaded surfaced openings of the tire-rim and threaded surfaced openings of the felly-rim to wedgingly tighten by drawing the said rims toward each other by turnings of the bolts 11, thereby to hold against possible displacement, the tire-rim to the felly-rim, whether a pin 13 becomes disconnected from the extremity of a bolt, or the head of a bolt is lost. The form of the threads of the respective inserted bolts aiding to said results. At the same time by said arrangement is permitted quick demounting of a punctured or disabled inflated tire from the felly of a wheel.

In the modified arrangement of Fig. 2, the wheel 4, has a felly 5, provided with a flanged rim 6, and at suitable distances apart is provided therein threaded surfaced recesses $9^a$, which are offset at $9^b$. The inflated tire 8, has a clencher rim 9, as shown, having at suitable distances apart provided therein unthreaded surfaced recesses $10^a$, which are offset at $10^b$. $11^a$, is one of a series of threaded tapering shouldered and offset bolts adapted, when the inflated tire 8, with its clencher rim 9, is in operative position with respect to the felly rim 6, of the wheel 4, of the said bolts $11^a$, being inserted through the tapering and offset openings formed by the tire and felly rims to lock by drawing the two rims toward each other by wedging actions thereof.

It will be observed that by the foregoing arrangements is obviated deflating of a tire prior to its removal from the felly or of the inflating of the same after it is applied to the felly of the wheel.

I do not claim introducing screw-bolts between the rim of a tire and the rim of a felly of a motor vehicle-wheel, as I am aware that such general arrangement is not broadly new, but what I claim as of my present invention is, wedgingly tightening by drawing the tire-rim and felly-rim of a motor vehicle-wheel toward each other to thereby firmly hold the same together against displacement, by the wedging action of the bolts, whether a head of a screw-bolt is lost or a terminal means of the bolt, is displaced.

Having thus described the nature and objects of my invention, what I claim as new and desire to secure by Letters Patent is:—

1. In a motor vehicle wheel, a tire having a rim, a felly having a rim, the respective rims in position arranged to form tapering transverse openings, one surface being unthreaded and the other threaded and threaded bolts arranged to engage the threaded portion of each of said openings to wedgingly tighten the rims together, against displacement.

2. In a motor vehicle wheel, a tire having a clamping rim, a felly-rim, the respective rims in position provided with offset tapering openings, one portion threaded and the other unthreaded and threaded bolts arranged to detachably engage in said openings to wedgingly tighten the rims together, against displacement.

In witness whereof, I have hereunto set my hand in the presence of two subscribing witnesses.

CHARLES B. SINER.

Witnesses:
THOMAS M. SMITH,
ELISABETH A. SHELDRAKE.